June 6, 1967 B. SOROKA 3,324,313
SERIES CONNECTED SCR'S SEQUENTIALLY FIRED BY CONSECUTIVE PULSES TO PROVIDE SINGLE OUTPUT PULSE AND REMAINING CONDUCTIVE UNTIL RESET
Filed Jan. 15, 1965
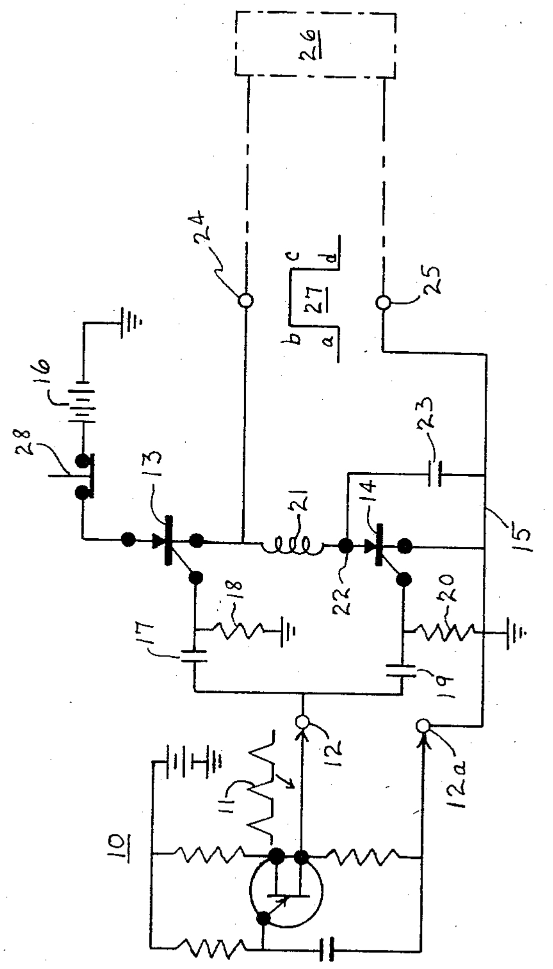
INVENTOR
BERNARD SOROKA
BY Harry M. Saragovitz, Edward J. Kelly & Herbert Berl
ATTORNEYS United States Patent Office 3,324,313
Patented June 6, 1967

3,324,313
SERIES CONNECTED SCR'S SEQUENTIALLY FIRED BY CONSECUTIVE PULSES TO PROVIDE SINGLE OUTPUT PULSE AND REMAINING CONDUCTIVE UNTIL RESET

Bernard Soroka, Baltimore, Md., assignor to the United States of America as represented by the Secretary of the Army Filed Jan. 15, 1965, Ser. No. 425,971
1 Claim. (Cl. 307—88.5)

ABSTRACT OF THE DISCLOSURE

A control circuit utilizing two series connected silicon controlled rectifiers, one of which is dependent upon the other for firing, responsive to two consecutive positive going pulses from a multipulse source to produce a single pulse output and remain in locked out condition thereafter to all other pulses until the circuit is reset. Each said positive going consecutive pulse is simultaneously applied to the gates of the silicon controlled rectifiers.

The invention described herein may be manufactured and used by or for the Government for governmental purposes, without the payment to me of any royalty thereon.

This invention relates to pulse responsive electronic control circuits for accurate precision control or firing of electronic devices.

An object of the invention is an electronic control circuit which produces a single output signal from a multiplicity of input signals.

Another object of the invention is a pulse generating means producing but a single pulse from a multiplicity of input pulses.

A further object of the invention is an electronic control means responsive to two consecutive pulses from a multipulse source to produce a single output pulse and remain locked out to all pulses except the two consecutive pulses.

Referring now to the drawings, 10 indicates a unijunction relaxation oscillator used for generating the pulses 11 which are applied across input terminals 12 and 12*a* of the control device of the invention. The unijunction relaxation oscillator 10 is shown only as a source for generating pulses, it being understood that other pulse sources are applicable and that the pulses generated may be of any desired shape and spacing. Silicon controlled rectifiers 13 and 14 are connected in series. The cathode of rectifier 14 is connected to the common circuit 15 and anode of rectifier 13 is connected to the positive terminal of battery 16 which has its negative terminal connected to common circuit 15. A differentiating circuit consisting of series connected capacitor 17 and resistor 18 couples the gate of rectifier 13 with the input terminal 12. A second differentiating circuit consisting of series connected capacitor 19 and resistor 20 couples the gate of rectifier 14 to the input terminal 12. The cathode of rectifier 13 is connected to the anode of rectifier 14 by means of a choke coil 21, the lead 22 of which is connected to a capacitor 23 which is returned to common circuit 15. The choke coil 21 and capacitor 23 comprise delay means for preventing turning "on" the silicon controlled rectifier

14 when a pulse of relatively long duration is applied to input terminal 12 for the purpose of turning "on" silicon controlled rectifier 13. The output pulse of the control circuit is taken across terminals 24 and 25 and applied to a utilization device 26. Terminal 24 is electrically connected between the cathode of rectifier 13 and the anode of rectifier 14. Terminal 25 is connected to the common circuit 15. In operation a train of pulses from pulse generator 10 is applied through terminals 12 and 12*a* and to the gates of the silicon control rectifiers through the differentiating networks. The first pulse, so applied, turns "on" the silicon controlled rectifier 13 which causes the potential at the anode of silicon controlled rectifier 14 to rise from substantially zero to a maximum potential as indicated by line *a–b* of the diagram representing the output pulse 27. The anode of rectifier 14 remains at this maximum potential as indicated by line *b–c* of the diagram representing the output pulse 27 until rectifier 14 is turned "on" by the second pulse of said train of pulses. Once the rectifier 13 is turned "on" it cannot be turned "off" by subsequent pulses applied at its gate and therefore is locked out in regard to said subsequent pulses. The second pulse of said train of pulses therefore does not affect the retifier 13, but turns "on" rectifier 14 resulting in a voltage drop across the rectifier 14 as indicated by line *c–d* of the diagram representing the output pulse 27. Since rectifier 14 is now in the "on" or conducting state, subsequent pulses will not affect it and it will remain in this state, as well as rectifier 13, until reset switch 28 is opened, or by reversing the current and voltage of the anode and cathode. Although the foregoing refers to silicon controlled rectifiers, it is not intended to narrow the invention to the use of such solid state devices because, for example, either hot or cold thyratrons with appropriate biasing means may be substituted for the silicon controlled rectifiers.

While a preferred embodiment of the invention has been shown and described for the purpose of illustration, it will be understood that equivalents exist and that reasonable modifications may be made in the practice of the invention without departing from the spirit or scope of the following claim.

I claim:

A control circuit responsive to two consecutive pulses of a train of positive going pulses to produce a single output pulse and remain locked out to subsequent pulses comprising in combination, a D.C. potential source, first and second silicon controlled rectifiers each having an anode, a cathode and gate electrode, means for connecting the anode of said first silicon controlled rectifier to the positive potential of said D.C. potential source, means for connecting the cathode of said second silicon controlled rectifier to the negative potential of said D.C. potential source, a differentiating network for each of said gates coupling said gates to said train of positive going pulses whereby positive going gating signals are simultaneously applied to said gates, time delay means coupling the cathode of said first silicon controlled rectifier to the anode of said second silicon controlled rectifier to prevent said positive potential from being applied to the anode of said second silicon controlled rectifier at the time when the first of said two consecutive pulses is simultaneously applied through said differentiating networks to said gates causing said first silicon controlled rectifier to conduct, said second silicon controlled rectifier subsequently conducting when the second of said two consecutive pulses is applied to said gates through said differentiating networks, said time delay means comprising a series connected choke and capacitor, said choke connecting the cathode of said first silicon controlled rectifier to the anode of said second silicon controlled rectifier, said capacitor being returned to said negative potential, a pair of output terminals, means connecting one of said output terminals to the cathode of said first silicon controlled rectifier, means connecting the other of said output terminals to the cathode of said second silicon controlled rectifier, said first silicon controlled rectifier when gated producing a rise in potential at said output terminals and said second silicon controlled rectifier when gated producing a fall in potential at said output terminals and switch means in series with said D.C. potential source and said silicon controlled rectifiers for resetting said control circuit, said silicon controlled rectifiers remaining in a state of conduction and non-responsive to subsequent pulses until said switch means is operated.

References Cited

UNITED STATES PATENTS 3,248,634 4/1966 Fudaley et al. ---------- 321—2

OTHER REFERENCES

"PNPN Thyristor Flip-Flop" by Razi in IBM Technical Disclosure Bulletin, vol. 5, No. 12, dated May 1963, pp. 59 and 60.

ARTHUR GAUSS, *Primary Examiner.*

S. D. MILLER, *Assistant Examiner.*